US012676403B2

(12) United States Patent
Li et al.

(10) Patent No.: US 12,676,403 B2
(45) Date of Patent: Jul. 7, 2026

(54) ANTENNA VIBRATOR AND ANTENNA

(71) Applicant: Suzhou Luxshare Technology Co., Ltd., Suzhou City (CN)

(72) Inventors: Zhenhua Li, Suzhou City (CN); Wenkai Xu, Suzhou City (CN); Qiang Li, Suzhou City (CN); Gang Zhou, Suzhou City (CN)

(73) Assignee: SUZHOU LUXSHARE TECHNOLOGY CO., LTD., Suzhou City (CN)

( * ) Notice: Subject to any disclaimer, the term of this patent is extended or adjusted under 35 U.S.C. 154(b) by 36 days.

(21) Appl. No.: 18/735,004

(22) Filed: Jun. 5, 2024

(65) Prior Publication Data

US 2025/0038398 A1 Jan. 30, 2025

(30) Foreign Application Priority Data

Jul. 26, 2023 (CN) ......................... 202321981991.7

(51) Int. Cl.
*H01Q 1/24* (2006.01)
*H01Q 1/36* (2006.01)

(52) U.S. Cl.
CPC ............... *H01Q 1/246* (2013.01); *H01Q 1/36* (2013.01)

(58) Field of Classification Search
CPC ............ H01Q 1/24; H01Q 1/246; H01Q 1/38; H01Q 1/36; H01Q 19/10; H01Q 1/42; H01Q 9/045; H01Q 9/0478; H01Q 9/0442; H01Q 13/10; H01Q 21/24
See application file for complete search history.

(56) References Cited

U.S. PATENT DOCUMENTS

| | | | | |
|---|---|---|---|---|
| 2011/0012788 A1* | 1/2011 | Rowell | H01Q 9/0428 343/700 MS |
| 2022/0029279 A1* | 1/2022 | Jiang | H01Q 19/10 |
| 2023/0170630 A1* | 6/2023 | Du | H01Q 5/48 343/702 |

FOREIGN PATENT DOCUMENTS

| | | | | |
|---|---|---|---|---|
| CN | 102544711 B | | 9/2015 | |
| CN | 207353451 U | | 5/2018 | |
| CN | 111541010 A | * | 8/2020 | H01Q 1/36 |
| CN | 213753054 U | | 7/2021 | |
| CN | 214254715 U | * | 9/2021 | |

* cited by examiner

*Primary Examiner* — Thai Pham
(74) *Attorney, Agent, or Firm* — Birch, Stewart, Kolasch & Birch, LLP

(57) ABSTRACT

The embodiment of the disclosure discloses an antenna vibrator and an antenna, wherein the antenna vibrator comprises a radiation board. The radiation board is polygonal, and some areas of the radiation board are bent down to provide multiple supporting portions and multiple leaks. The corners of the radiation board are bent down provided with multiple bending portions, and each bending portion extends to both sides to form two extending portions. Therefore, by providing bending portions and extending portions, it may effectively reduce the size of the antenna vibrator, thereby optimizing the isolation of the antenna vibrator and increasing the working bandwidth of the antenna vibrator. Moreover, after the antenna vibrator is arrayed, the cross-polarization ratio may meet high-performance specifications without adding boundary conditions.

18 Claims, 5 Drawing Sheets

ANTENNA VIBRATOR AND ANTENNA

CLAIM OF PRIORITY AND CROSS-REFERENCE TO RELATED APPLICATION(S)

This application claims the benefit of Chinese Patent Application No. 202321981991.7, filed on Jul. 26, 2023, which is incorporated herein by reference in its entirety.

BACKGROUND OF THE DISCLOSURE

1. Field of the Disclosure

The present disclosure relates to the field of communication technology, and particularly to an antenna vibrator and an antenna.

2. Description of the Related Art

A sheet metal stamping vibrator is a commonly used vibrator in 5G Massive Multiple Input Multiple Output (MIMO) base station antennas. In the current design scheme, after forming an array of vibrators, it is necessary to optimize the cross polarization ratio by adding boundary conditions (such as metal sheets) to the sub array. On the other hand, an excessive size of the vibrator may lead to a small spacing between the vibrators, which may affect the isolation of the sub array.

BRIEF DESCRIPTION OF THE DISCLOSURE

In view of this, the present disclosure is to provide an antenna vibrator and an antenna, by setting bending portions and extending portions to achieve optimized isolation of the antenna vibrator and cross-polarization ratio after arraying.

In the first aspect, the embodiment of the disclosure provides an antenna vibrator, comprises: a radiation board, wherein the radiation board is polygonal, a part of the radiation board bends downwards to form a plurality of supporting portions and a plurality of leaks. A plurality of corners of the radiation board bend downwards to form a plurality of bending portions, and each of the bending portions extends to both sides to form two extending portions.

Furthermore, the extending portion extends along the edge of the radiation board, the length of the extending portion is equal to or greater than 0.05 center frequency wavelengths and is equal to or less than 0.09 center frequency wavelengths, and the height of the extending portion is equal to or less than 0.06 center frequency wavelengths.

Furthermore, the extending portion is hollowed out at a distance from the corresponding bending portion to form a gap with the radiation board, the length of the gap is greater than or equal to 0.03 center frequency wavelengths and is less than or equal to 0.07 center frequency wavelengths.

Furthermore, the radiation board is square, and the side length of the radiation board is greater than or equal to 0.3 center frequency wavelengths and is less than or equal to 0.4 center frequency wavelengths; and the four leaks are evenly distributed on the diagonal of the antenna vibrator.

Furthermore, the supporting portion is bent downwards along the inner edge of the leak.

Furthermore, the lower end of the supporting portion is bent to form a connecting portion.

Furthermore, the connecting portion is provided with a chamfer.

Furthermore, the height of the supporting portion is greater than or equal to 0.06 center frequency wavelengths and is less than or equal to 0.12 center frequency wavelengths.

Furthermore, the leak is rectangular, the length of the leak is greater than or equal to 0.08 center frequency wavelengths and is less than or equal to 0.14 center frequency wavelengths, and the width of the leak is greater than or equal to 0.005 center frequency wavelengths and is less than or equal to 0.045 center frequency wavelengths.

In the second aspect, the embodiment of the disclosure also provides an antenna, comprises: an antenna vibrator as described in the first aspect; and a feeding piece, wherein the feeding piece is electrically connected to the supporting portion of the antenna vibrator.

The embodiment of the disclosure provides an antenna vibrator and an antenna, wherein the antenna vibrator includes a radiation board. The radiation board is polygonal, and some areas of the radiation board are bent down to form multiple supporting portions and multiple leaks. The corners of the radiation board are bent down to form multiple bending portions, and each bending portions extends to both sides to form two extending portions. Therefore, by setting bending portions and extending portions, it may effectively reduce the size of the antenna vibrator, thereby optimizing the isolation of the antenna vibrator and increasing the working bandwidth of the antenna vibrator. Moreover, after the antenna vibrator is arrayed, the cross-polarization ratio may meet high-performance specifications without adding boundary conditions.

BRIEF DESCRIPTION OF THE DRAWINGS

The above and other objectives, features, and advantages of the disclosure will become clearer through the description of the embodiment of the disclosure with reference to the accompanying drawings, in which.

DETAILED DESCRIPTION OF EMBODIMENTS OF THE DISCLOSURE

The following describes this application based on embodiments, but this application is not limited to these embodiments. In the following detailed description of this application, some specific details are elaborately described. For those skilled in the art, the absence of detailed descriptions of these details does not prevent them from fully understanding this application. To avoid confusing the essence of this application, well-known methods, processes, flows, components, and circuits are not detailed.

In addition, those skilled in the art should understand that the figures provided here are for illustrative purposes only, and the figures may not be drawn to scale.

Unless otherwise clearly specified and defined, the terms "installation", "connection", "fixation", and others should be understood broadly. For example, they may be fixed connections, or they may be detachable connections, or integrated; they may be mechanical connections, or electrical connections; they may be direct connections, or indirect connections through an intermediate medium, they may be internal connections between two components or the interaction between two components, unless otherwise clearly defined. For those skilled in the art, the specific meaning of the above terms in this application may be understood based on the specific situation.

Unless explicitly required by the context, the words "include", "contains", and similar terms throughout the application document should be interpreted as inclusive rather than exclusive or exhaustive; that is, they have the meaning of "including but not limited to".

In the description of this application, it is necessary to understand that the terms "first", "second", etc. are only used for descriptive purposes and should not be understood as indicating or implying relative importance. Furthermore, in the description of this application, unless otherwise specified, the meaning of "multiple" is two or more.

Figure 1:
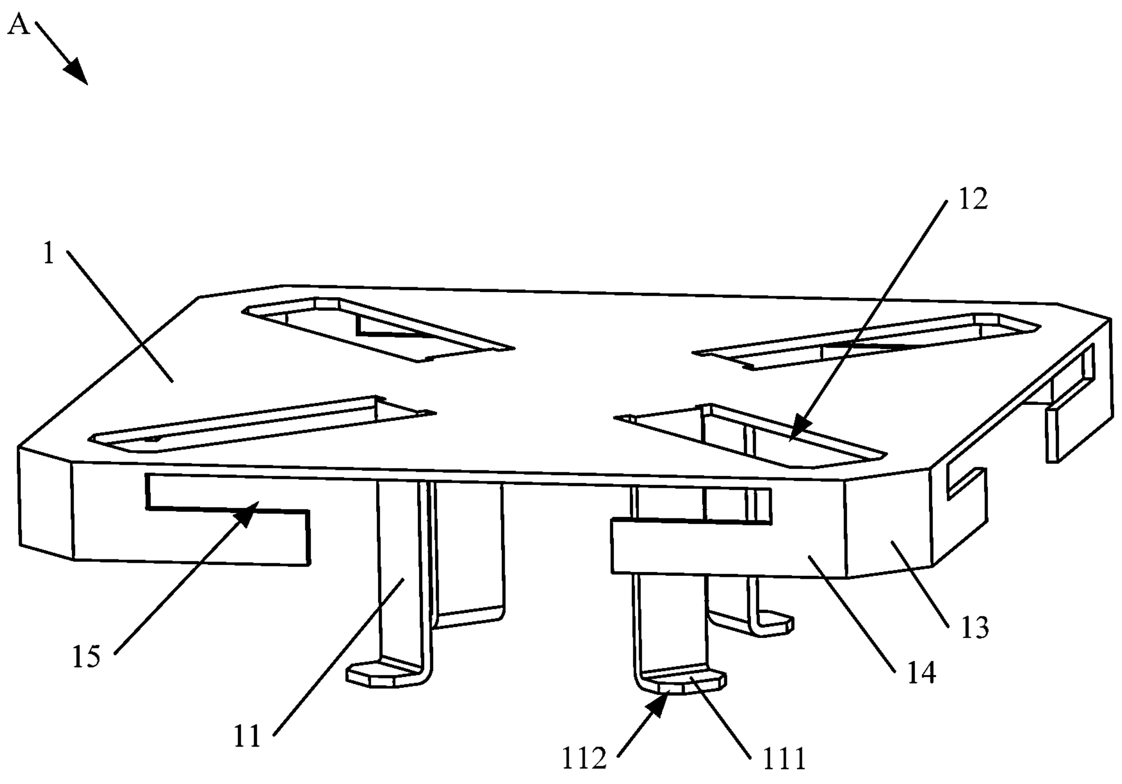
FIG. 1 is a structural diagram of the antenna vibrator provided by the embodiment of the disclosure.

Massive MIMO technology is one of the key technologies of 5G, which uses a large number of array antennas on the base station transceiver to achieve greater wireless data traffic and connection reliability. Compared with the previous single/dual polarized antenna with 4/8 channel antennas, large-scale antenna technology may improve the efficiency of spectrum and energy utilization through different dimensions (spatial domain, time domain, frequency domain, polarization domain, etc.); 3D shaping and channel estimation technology may adaptively adjust the phase and power of each antenna vibrator, significantly improving the beam pointing accuracy of the system, focusing signal strength on specific pointing areas and specific user groups, significantly reducing intra-cell self-interference and interference from adjacent cells while enhancing user signals, making it an excellent technology for improving the signal-to-interference ratio of user signals. It should be noted that FIG. 1 is a structural diagram of the antenna vibrator provided by the embodiment of the disclosure. Combined with FIG. 1, this embodiment of the disclosure provides antenna vibrator A for 5G Massive MIMO base station antennas.

Figure 2:
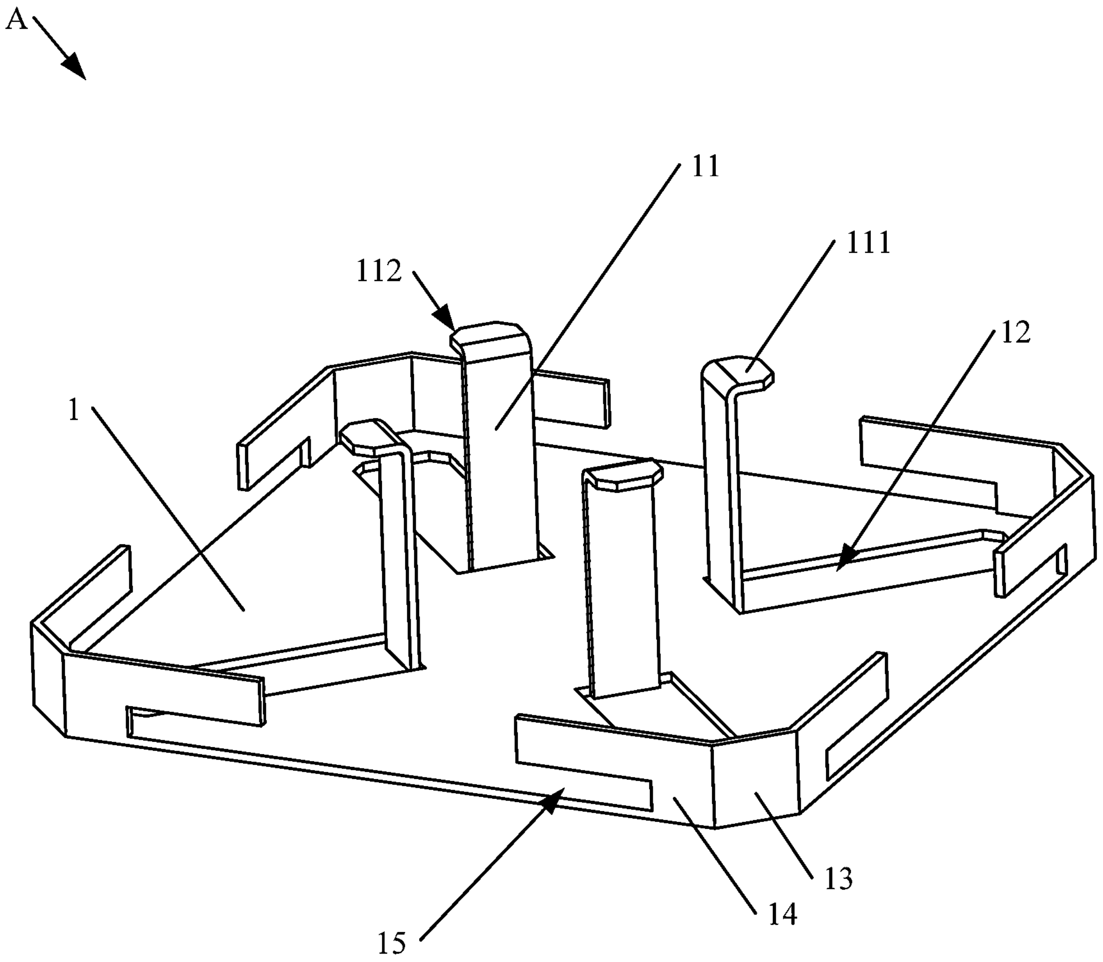
FIG. 2 is a structural schematic diagram of the antenna vibrator provided by the embodiment of the disclosure from another perspective.

FIG. 2 is a structural schematic diagram of the antenna vibrator provided by the embodiment of the disclosure from another perspective. Combined with the structure shown in FIG. 1 and FIG. 2, the antenna vibrator A includes a radiation board 1, which is used for transmitting or receiving communication signals. Furthermore, some areas of the radiation board 1 bends downwards to form a plurality of supporting portions 11 and a plurality of leaks 12. Among them, the supporting portions 11 play a supporting and feeding role for the radiation board 1. It should be noted that the antenna vibrator A in this embodiment is formed by stamping a metal sheet (such as aluminum sheet or copper sheet). That is to say, after being stamped, the metal sheet forms a radiation board 1 with a flat structure and downwardly bent supporting portions 11, while the leaks 12 are through-holes on the radiation board 1 corresponding to the supporting portions 11. As an optional embodiment, the supporting portions 11 are set by welding.

Furthermore, as shown in FIG. 1 and FIG. 2, the antenna vibrator A of this embodiment is a structural improvement on the square radiation board 1. Specifically, the four corners of the radiation board 1 are provided with four downward-extending bending portions 13. Therefore, the antenna vibrator A is realized by stamping and forming integrally, with simple and efficient processing, and significantly reduces material costs. It should be noted that, in an alternative embodiment, the bending portions 13 may be formed by bending down parts of the corners of the radiation board 1, for example, two corners to form two bending portions 13. In another alternative embodiment, the radiation board 1 may be set to be a regular pentagon, regular hexagon or other symmetrical polygonal shapes, and the corresponding number of corners are bent down to form multiple bending portions 13. This ensures the stability of the antenna phase center. On the other hand, the antenna vibrator A is made by stamping a thin metal sheet, that is, the radiation board 1 is a thin metal sheet, meeting the design requirements for lightweight antennas. In addition, the radiation board 1 is provided with leaks 12 to help reduce the weight of the antenna vibrator A, so as to achieve lightweight antennas. It should be further noted that each bending portion 13 extends to both sides to form two extending portions 14. Therefore, by providing bending portions 13 and extending portions 14, it may effectively reduce the size of the antenna vibrator A, thereby optimizing its isolation and increasing its operating bandwidth. Moreover, after arraying the antenna vibrator A, the cross-polarization ratio may meet high-performance specifications without adding boundary conditions.

Figure 3:
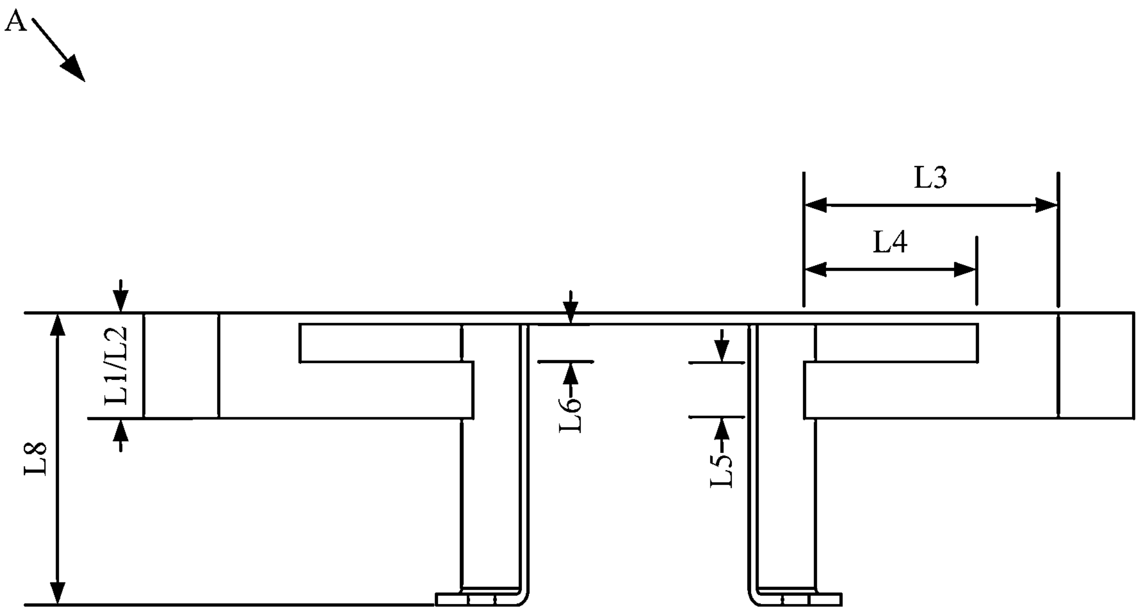
FIG. 3 is a schematic diagram of the main visual dimensions of the antenna vibrator provided in the embodiment of the disclosure.

FIG. 3 is a schematic diagram of the main visual dimensions of the antenna vibrator provided in the embodiment of the disclosure. As shown in FIG. 3, in one embodiment, the bending angle of the bending portion 13 is 90 degrees, that is, the bending portion 13 is perpendicular to the radiation board 1. Furthermore, the height L1 of the bending portion 13 is less than or equal to 0.06 center frequency wavelengths. It should be noted that the antenna has a certain operating frequency range, within which the antenna impedance is minimal and the efficiency is highest. The optimal midpoint of the operating frequency range is the center operating frequency, and the center frequency wavelength refers to the wavelength of the center operating frequency. In one embodiment, the height L1 of the bending portion 13 is set to 0.03 center frequency wavelengths. It should be noted that the length of the bending portion 13 may be set as required. Therefore, by setting the bending portion 13, it is convenient to increase the isolation of the antenna vibrator A and optimize the array cross-polarization ratio as well as increase the operating bandwidth of the antenna vibrator A.

As shown in FIG. 1 and FIG. 2, in one embodiment, the extending portion 14 extends along the edge of the radiation board 1. That is to say, each extending portion 14 is located in the same vertical plane as the corresponding edge of the radiation board 1, thereby preventing the extending portion 14 from increasing the size of the antenna vibrator A. Furthermore, as shown in FIG. 3, the height of the extending portion 14 is the same as that of the bending portion 13, that is, the height L2 of the extending portion 14 is less than or equal to 0.6 center frequency wavelengths. It is easy to understand that when the height L1 corresponding to the bending portion 13 is set to 0.3 center frequency wavelengths, the height L2 of the extending portion 14 is also 0.3 center frequency wavelengths. Still further, as shown in FIG. 3, the length L3 of the extending portion 14 is greater than or equal to 0.05 center frequency wavelengths and is less than or equal to 0.09 center frequency wavelengths. In one embodiment, the length L3 of the extending portion 14 is set to 0.07 center frequency wavelengths. Thus, by setting the bending portion 13 and extending portion 14, it may effectively reduce the size of the antenna vibrator A to optimize its isolation, and it may also make the cross-polarization ratio of the antenna vibrator A after arraying meet high-performance specifications without adding boundary conditions.

As shown in FIG. 1 and FIG. 2, in one embodiment, the part of the extending portion 14 away from the corresponding bending portion 13 is hollowed out, thereby forming a gap 15 with the radiation board 1. That is to say, the extending portion 14 is recessed from one end away from the corresponding bending portion 13, making the extending portion 14 form an L-shape, and the notch created by the recess of the extending portion 14 is formed as the gap 15. Furthermore, as shown in FIG. 3, the length L4 of the gap 15 is greater than or equal to 0.03 center frequency wavelengths and is less than or equal to 0.07 center frequency wavelengths. In one embodiment, the length L4 of the gap 15 is set to 0.05 center frequency wavelengths. On the other hand, the height L2 corresponding to the extending portion 14 is 0.03 center frequency wavelengths, and the height L5 of the end of the extending portion 14 away from the corresponding bending portion 13 is 0.02 center frequency wavelengths, that is, the width L6 of the gap 15 is 0.01 center frequency wavelengths. Therefore, by setting the gap 15, it helps to improve the cross-polarization ratio (axial and +60 degrees) of the antenna vibrator A, thereby realizing measures to cancel the provision of metal sheets or other measures to increase boundary conditions to improve the cross-polarization ratio.

Figure 4:
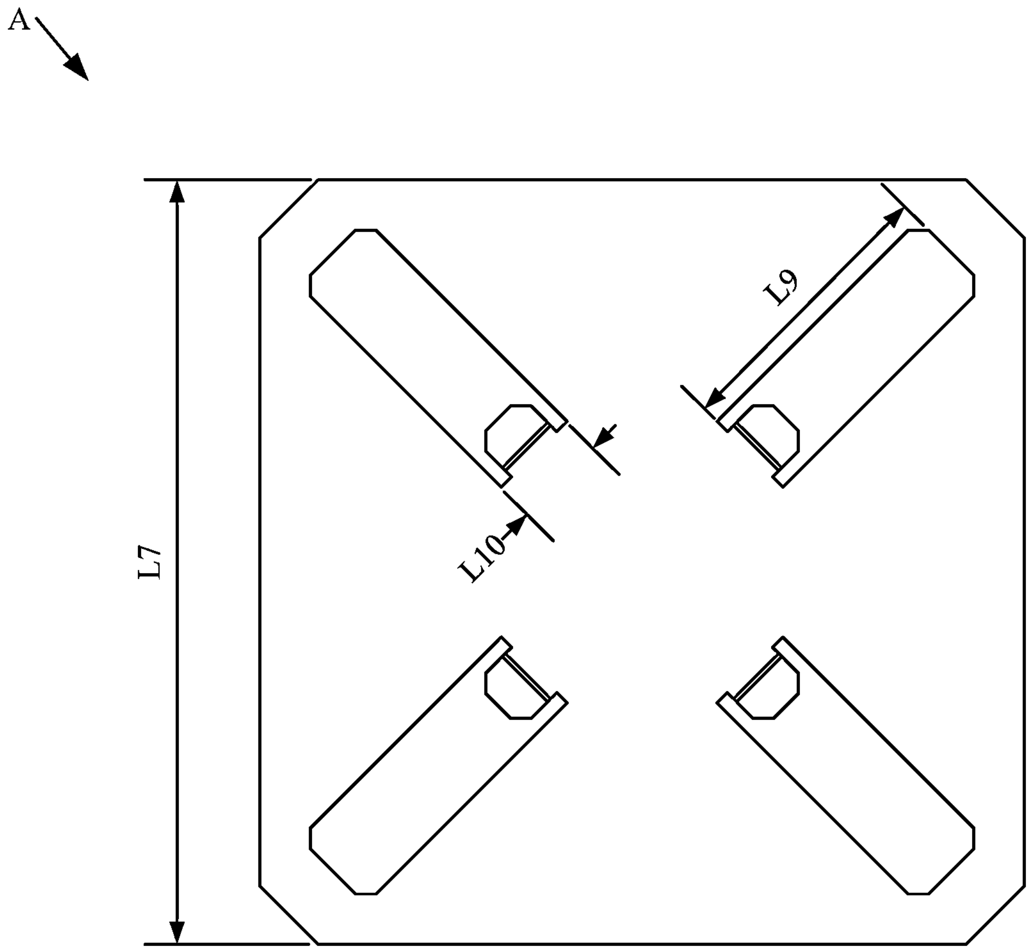
FIG. 4 is a schematic diagram of the top view dimensions of the antenna vibrator provided in the embodiment of the disclosure.

FIG. 4 is a schematic diagram of the top view dimensions of the antenna vibrator provided in the embodiment of the disclosure. As shown in FIG. 4, in one embodiment, the antenna vibrator A corresponds to a structural improvement on the square radiation board 1, and the side length L7 of the square radiation board 1 is greater than or equal to 0.3 center frequency wavelengths and is less than or equal to 0.4 center frequency wavelengths. In one embodiment, the side length L7 of the radiation board 1 is set to 0.35 center frequency wavelengths, that is, the antenna vibrator A is stamped from a metal sheet with a side length of 0.35 center frequency wavelength. The operating frequency band of the antenna vibrator A is from 3.4 GHz to 4 GHZ, with a bandwidth of 600 MHZ. Furthermore, there are four leaks 12, all of which are formed as rectangular through-holes. The four leaks 12 are evenly distributed on the diagonal lines of the radiation board 1, forming a cross-shaped pattern with central symmetry. At the same time, each leak 12 corresponds to one bending portion 13 and one supporting portion 11.

It should be noted that, as shown in FIG. 1 and FIG. 2, the diagonal line of the radiation board 1 is perpendicular to the plane where the corresponding bending portion 13 is located. That is to say, the bending portion 13 is bent along a line on the radiation board 1 that is perpendicular to the diagonal line, making the bending portions 13 form an axially symmetric structure. At the same time, multiple bending portions 13 also form a structure that is symmetrical about the center of the radiation board 1. Furthermore, each bending portion 13 extends to both sides, forming two extending portions 14, so that multiple extending portions 14 also form a structure that is symmetrical about the center of the radiation board 1. Therefore, the stability of the antenna phase center is guaranteed.

As shown in FIG. 1 and FIG. 2, in one embodiment, the supporting portion 11 is bent downwards along the inner edge of the leak 12. That is to say, the supporting portion 11 is located on the inward side. As shown in FIG. 3, the bending angle of the supporting portion 11 is 90 degrees, that is, the supporting portion 11 is perpendicular to the radiation board 1. Therefore, after the antenna vibrator A is connected to the feeding piece B through the supporting portion 11, the radiation board 1 remains parallel to the antenna cover, thereby ensuring the propagation effect of electromagnetic waves.

As shown in FIG. 1 and FIG. 2, in one embodiment, the lower end of the supporting portion 11 is bent outward to form a connecting portion 111, and the antenna vibrator A is electrically connected to the feeding piece B through the connecting portion 111. Furthermore, the bending angle of the connecting portion 111 is 90 degrees, that is, the connecting portion 111 is perpendicular to the supporting portion 11 and parallel to the radiation board 1. Therefore, after the antenna vibrator A is electrically connected to the feeding piece B through the connecting portion 111, the radiation board 1 remains parallel to the antenna cover, thereby ensuring the propagation effect of electromagnetic waves. On the other hand, bending the connecting portion 111 outward facilitates inspection of the welding condition of the antenna vibrator A.

It should be noted that, based on the number of supporting portions 11 being four, the corresponding number of connecting portions 111 is also four. Therefore, antenna vibrator A is connected to the four feeding points on the feeding piece B through four connecting portions 111, that is, a four-point feeding method is adopted to ensure the stability of the antenna phase center.

As shown in FIG. 1 and FIG. 2, in one embodiment, the connecting portion 111 is provided with a chamfer 112. That is to say, the connecting portion 111 is formed into a hexagonal structure. Correspondingly, one end of the leak 12 is designed to match the chamfer 112. It is easy to understand that, through the chamfer 112, it is convenient to check the welding condition of the antenna vibrator A. It should be noted that the structure of the connecting portion 111 may be set as required. For example, as an alternative embodiment, the connecting portion 111 is set to a semi-circular structure.

As shown in FIG. 3, in one embodiment, the height L8 of the supporting portion 11 is greater than or equal to 0.06 center frequency wavelengths and is less than or equal to 0.12 center frequency wavelengths. In one embodiment, the height L8 of the supporting portion 11 is set at 0.09 center frequency wavelengths. It is easy to understand that the height value of the supporting portion 11 is greater than the height of the bending portion 13 and the extending portion 14, so that the antenna vibrator A is placed on the feeding piece B through the supporting portion 11.

As shown in FIG. 1 and FIG. 2, in one embodiment, the leak 12 is rectangular. Furthermore, as shown in FIG. 4, the length L9 of the leak 12 is greater than or equal to 0.08 center frequency wavelengths and is less than or equal to 0.14 center frequency wavelengths, and the width L10 of the leak 12 is greater than or equal to 0.005 center frequency wavelengths and is less than or equal to 0.045 center frequency wavelengths. In one embodiment, the length L9 of the leak 12 is set to 0.11 center frequency wavelengths, and the width L10 of the leak 12 is set to 0.025 center frequency wavelengths. It is easy to understand that the leak 12 may also be set to other shapes, and the shape of the supporting portion 11 corresponds to that of the leak 12.

The antenna vibrator A provided in the embodiment of the disclosure achieves an improved design for the radiation surface of antenna vibrator A by setting a bending portion 13 and an extending portion 14 on the radiation board 1, thereby optimizing the isolation of antenna vibrator A, increasing the operating bandwidth of antenna vibrator A, and improving the cross-polarization ratio of antenna vibrator A after arraying, so that the cross-polarization ratio of the array meets high-performance specifications without adding boundary conditions.

Figure 5:
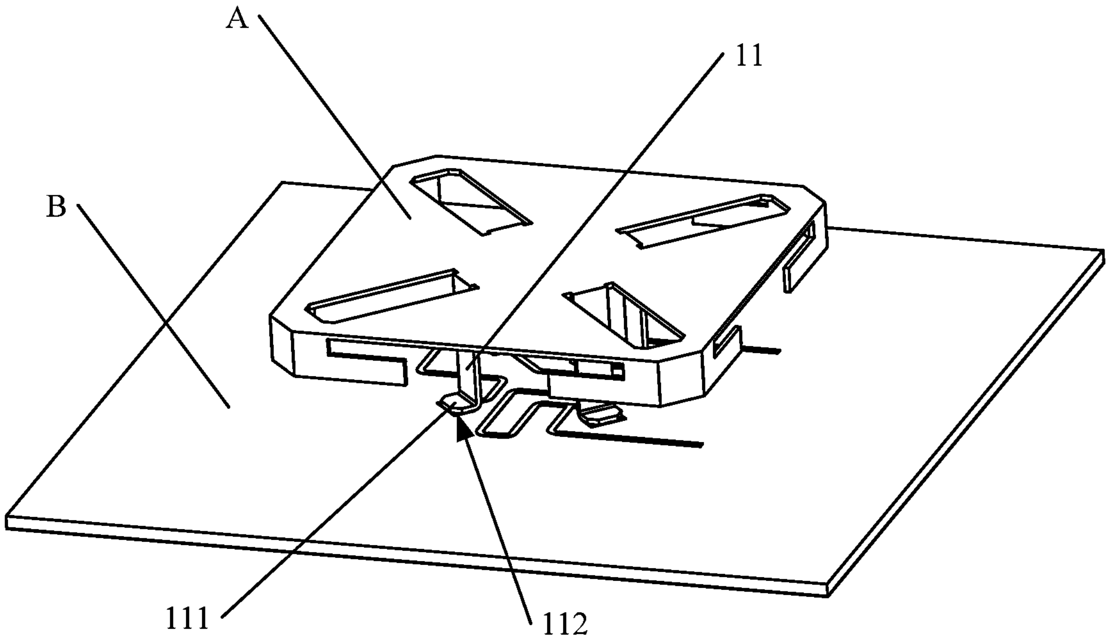
FIG. 5 is a partial structural diagram of the antenna provided in the embodiment of the disclosure.

FIG. 5 is a partial structural diagram of the antenna provided in the embodiment of the disclosure. As shown in FIG. 5, the antenna includes an antenna vibrator A and a feeding piece B. It should be noted that the antenna also includes an antenna cover and a reflection board (not shown in the figures). Furthermore, the structure of the antenna vibrator A is as described above, and will not be elaborated on here. The antenna vibrator A is electrically connected to the feeding piece B through the connecting portion 111 on the supporting portion 11, and the antenna cover is placed on the antenna vibrator A.

Furthermore, the feeding piece B includes a circuit board. The side of the circuit board facing the antenna vibrator A has a feed circuit. The connecting portion of the antenna vibrator A is connected to the feed point of the feed circuit through fully automatic reflow soldering (surface mount soldering) or other methods, which may save assembly labor and assembly time. The antenna cover is made of materials such as polyvinyl chloride or glass fiber reinforced plastic, thereby serving as an encapsulation and protection.

The antenna provided in the embodiment of the disclosure achieves an improved design for the radiation surface of antenna vibrator A by setting a bending portion 13 and an extending portion 14 on the antenna vibrator A, thereby optimizing the isolation of the antenna vibrator A and the cross-polarization ratio after the antenna vibrator A is arrayed, so that the cross-polarization ratio of the array meets high-performance specifications without adding boundary conditions.

The embodiment of the disclosure provides an antenna vibrator and an antenna, wherein the antenna vibrator comprises a radiation board. The radiation board is polygonal, and part of the area of the radiation board is bent down to form multiple supporting portions and multiple leaks. The corners of the radiation board are bent down to form multiple bending portions, and each bending portion extends to both sides to form two extending portions. Therefore, by setting bending portions and extending portions, it may effectively reduce the size of the antenna vibrator, thereby optimizing the isolation of the antenna vibrator and increasing the working bandwidth of the antenna vibrator. Moreover, after the antenna vibrator is arrayed, the cross-polarization ratio may meet high-performance specifications without adding boundary conditions.

The above-mentioned is only a preferred embodiment of this application and is not intended to limit this application. For those skilled in the art, this application may be subject to various modifications and variations. Any modifications, equivalent replacements, and improvements made within the spirit and principle of this application should be included in the scope of protection of this application.

We claim:

1. An antenna vibrator, comprises:

a radiation board, wherein the radiation board is polygonal, a part of the radiation board bends downwards to form a plurality of supporting portions and a plurality of leaks; a plurality of corners of the radiation board bend downwards to form a plurality of bending portions, and each of the bending portions extends to both sides to form two extending portions;

wherein each extending portion is hollowed out at a distance from a corresponding bending portion to form a gap with the radiation board;

the extending portion is recessed from one end away from the corresponding bending portion, making the extending portion form an L-shape, and a notch created by a recess of the extending portion is formed as the gap.

2. The antenna vibrator according to claim 1, wherein the extending portion extends along the edge of the radiation board, the length of the extending portion is equal to or greater than 0.05 center frequency wavelengths and is equal to or less than 0.09 center frequency wavelengths, and the height of the extending portion is equal to or less than 0.06 center frequency wavelengths.

3. The antenna vibrator according to claim 2, wherein the length of the gap is greater than or equal to 0.03 center frequency wavelengths and is less than or equal to 0.07 center frequency wavelengths.

4. The antenna vibrator according to claim 1, wherein the radiation board is square, and the side length of the radiation board is greater than or equal to 0.3 center frequency wavelengths and is less than or equal to 0.4 center frequency wavelengths; and the four leaks are evenly distributed on the diagonal of the antenna vibrator.

5. The antenna vibrator according to claim 1, wherein the supporting portion is bent downwards along the inner edge of the leak.

6. The antenna vibrator according to claim 1, wherein the lower end of the supporting portion is bent to form a connecting portion.

7. The antenna vibrator according to claim 6, wherein the connecting portion is provided with a chamfer.

8. The antenna vibrator according to claim 1, wherein the height of the supporting portion is greater than or equal to 0.06 center frequency wavelengths and is less than or equal to 0.12 center frequency wavelengths.

9. The antenna vibrator according to claim 1, wherein the leak is rectangular, the length of the leak is greater than or equal to 0.08 center frequency wavelengths and is less than or equal to 0.14 center frequency wavelengths, and the width of the leak is greater than or equal to 0.005 center frequency wavelengths and is less than or equal to 0.045 center frequency wavelengths.

10. An antenna, comprises:

an antenna vibrator of claim 1; and a feeding piece, wherein the feeding piece is electrically connected to the supporting portion of the antenna vibrator.

11. The antenna according to claim 10, wherein the extending portion extends along the edge of the radiation board, the length of the extending portion is equal to or greater than 0.05 center frequency wavelengths and is equal to or less than 0.09 center frequency wavelengths, and the height of the extending portion is equal to or less than 0.06 center frequency wavelengths.

12. The antenna according to claim 11, wherein the length of the gap is greater than or equal to 0.03 center frequency wavelengths and is less than or equal to 0.07 center frequency wavelengths.

13. The antenna according to claim 10, wherein the radiation board is square, and the side length of the radiation board is greater than or equal to 0.3 center frequency wavelengths and is less than or equal to 0.4 center frequency wavelengths; and the four leaks are evenly distributed on the diagonal of the antenna vibrator.

14. The antenna according to claim 10, wherein the supporting portion is bent downwards along the inner edge of the leak.

15. The antenna according to claim 10, wherein the lower end of the supporting portion is bent to form a connecting portion.

16. The antenna according to claim 15, wherein the connecting portion is provided with a chamfer.

17. The antenna according to claim 10, wherein the height of the supporting portion is greater than or equal to 0.06 center frequency wavelengths and is less than or equal to 0.12 center frequency wavelengths.

18. The antenna according to claim 10, wherein the leak is rectangular, the length of the leak is greater than or equal to 0.08 center frequency wavelengths and is less than or equal to 0.14 center frequency wavelengths, and the width of the leak is greater than or equal to 0.005 center frequency wavelengths and is less than or equal to 0.045 center frequency wavelengths.

* * * * *